United States Patent [19]

Mosher

[11] Patent Number: 4,604,433

[45] Date of Patent: Aug. 5, 1986

[54] THERMOSETTING FURAN BASED RESIN CONTAINING NIOBIUM AND/OR TANTALUM

[75] Inventor: Paul V. Mosher, Torrance, Calif.

[73] Assignee: Hitco, Newport Beach, Calif.

[21] Appl. No.: 628,658

[22] Filed: Jul. 6, 1984

[51] Int. Cl.$^4$ ............................................. C08G 79/00
[52] U.S. Cl. .................................... 525/411; 525/534; 525/539; 528/166; 528/192; 528/306; 528/392; 528/395
[58] Field of Search ............... 528/166, 395, 192, 392, 528/306, 9; 525/411, 534, 539

[56] References Cited

U.S. PATENT DOCUMENTS 4,185,043  1/1980  Shaffer et al. ...................... 525/364

*Primary Examiner*—Harold D. Anderson
*Attorney, Agent, or Firm*—Roylance, Abrams, Berdo & Goodman

[57] ABSTRACT

The properties of a thermosetting furan based polymer are improved by incorporating therein at least one metal selected from the group consisting of niobium and/or tantalum.

9 Claims, No Drawings

THERMOSETTING FURAN BASED RESIN CONTAINING NIOBIUM AND/OR TANTALUM

BACKGROUND OF THE INVENTION

This invention relates to thermosetting furan based resins containing niobium and/or tantalum chemically bonded in the backbone of the polymer.

In preparing high-temperature, corrosion and ablative resistant structures, it is the practice to impregnate refractory materials with a synthetic resin, shape the structure to the desired form, and thereafter finally cure the resin at the necessary elevated temperatures. Useful resins used heretofore for this purpose have included, for example, phenolic resins, epoxy resins and the like. With the advent of aerospace products, the requirements for materials having suitable ablative characteristics have become even more critical and, accordingly, the presence of carbonized products has found particular acceptable application in this field. Thus, in preparing such products, resin impregnated refractory materials such as silica, carbon and graphite fibers and fabrics have been heated at high temperatures in order to reduce the impregnated resins substantially to carbon. The resulting products have improved high-temperature characteristics due to the carbonized matrix materials present therein. The properties of the resins used to impregnate and coat the refractory fiber materials must be such that during the pyrolysis outgassing problems are minimized with a substantial amount of the original resin material being retained in the form of carbon matrix in the product structure. Thus, resin products, which upon carbonization undergo extensive volatilization, will not only yield a product in which a substantial amount of the pyrolyzing resin matrix has been driven off, but there is the additional danger that outgassing may occur at such a rate and in such a manner that the integrity of the refractory fibers or cloth composite may be impaired. In addition where a substantial portion of the resin has been decomposed during the carbonization, a weakened structure may also result.

U.S. Pat. No. 4,185,043 to Shaffer discloses that the properties of polymers may be improved by incorporating therein at least one metal selected from the group consisting of tungsten and molybdenum. The presence of the metal atoms in the basic resin molecule make possible the formulation of resin matrix systems which are capable of absorbing large amounts of energy for specific related applications.

SUMMARY OF THE INVENTION

It has now been discovered that the properties of thermosetting furan based polymers may be improved by incorporating therein at least one metal selected from the group consisting of niobium and/or tantalum. These polymers and their respective chars impart improved oxidation resistance and unique energy absorbing characteristics to carbon/carbon materials. The improved oxidation resistance and the energy absorbing characteristics which are displayed by these polymers and their carbonized or graphitized products could not be achieved with particulate metal additives dispersed within the thermosetting resins.

DETAILED DESCRIPTION OF THE INVENTION

The niobium and/or tantalum containing thermosetting polymers of this invention may be prepared, for example, by the reaction of one mole of niobium or tantalum penta(n)butoxide with at least 2 moles of furfuryl alcohol and from 0.01 to 3.0 moles of a hydroxy terminated dienophile prepolymer, e.g., a hydroxy terminated ester of maleic acid. The metal alkoxides probably undergo transalocholysis reactions with the furfuryl alcohol and/or the furfuryl alcohol/diene adduct, splitting out butyl alcohol, and forming alkoxy linkages with the organic consitutents of the growing polymer. Also, a certain amount of nioboxane (i.e. niobium to oxygen to niobium) bridging could occur through the limited in situ hydrolysis of the reaction mixture. The niobium and/or tantalum atoms become chemically bonded within the thermoset polymer and these resins and their respective carbonized or graphitized products display desirable properties not found hitherto in resins. The resultant resin is a viscous polymer at room temperature but becomes less viscous as the temperature is raised.

The metal penta(n)butoxide may be prepared by direct reaction of the metal pentachloride with n-butanol in the presence of a base or in the manner described by Bradley et al, "Normal Alkoxides of Quinquevalent Niobium," J.C.S., 460 (1956) 2381–2384. Prepolymers useful in preparing the thermosetting resins can be one of many hydroxy terminated dienophiles such as 1,4-dihydroxybutyne, 1,4-dihydroxybutene or hydroxy terminated esters of maleic acid such as disclosed in U.S. Pat. No. 4,087,482 to Shaffer, the disclosure of which is incorporated herein by reference. The flexibility of the thermosetting metal bearing resin can be modified by altering the prepolymer. The weight ratio of the furfuryl alcohol to the hydroxy terminated prepolymer can be varied from 3.0:1.0 to 1.6:1.0 without significantly modifying the properties of the resulting polymer. The niobium and tantalum contents of the thermosetting resins may be varied to provide from zero to 21% of niobium and from zero to 35% of tantalum without significantly modifying the mechanical properties of the resin.

A bimetallic resin may be prepared by combining a thermosetting resin containing niobium atoms with a thermosetting resin containing tantalum atoms in any proportion to produce bimetallic thermosetting polymers with varying niobium and tantalum ratios.

The thermosetting resins of this invention containing niobium and/or tantalum find use in coatings, films, castings, matrix resins and reimpregnation resins used to produce materials which resist oxidation and display energy absorbing properties.

The metallic component of these resins is an integral part of the molecular structure of the resin and is therefore of atomic or near atomic size. Such resins, when pyrolyzed, show no evidence of metal loss via vaporization nor are metal agglomerates present. This is in contrast to resin compositions in which organo metallics have been mixed into the resin systems prior to cure—such systems result in the formation of relatively large metallic particles during processing. In addition, the temperatures necessary to convert the resin to carbon and/or graphite may result in metal loss via vaporization.

The resins of this invention which have been converted to carbon and/or graphite, although containing metal atoms as high as 45% by weight, show no evidence of melting at temperatures higher than the melting point of the basic metal.

The metal containing polymers of this invention are valuable in preparing carbonized, high-temperature, corrosion resistant and ablative products under conditions known to those skilled in the art. Specifically, high silica fabric materials prepared by leaching glass fibers, as set forth in U.S. Pat. Nos. 2,491,761; 2,624,658; and 3,262,761 or carbonaceous fibers prepared by pyrolyzing cellulosic materials such as cotton, rayon and the like under controlled conditions, as disclosed, for example, in U.S. Pat. No. 3,294,489 may be impregnated with the metal containing resins of the present invention and thereafter pyrolyzed at temperatures of between about 800° and 5500° F. The resulting products retain a substantial and desirable amount of the original resin volume and weight, and yet are characterized by the improved ablative and temperature and corrosion resistant properties taken on as a result of the pyrolysis.

The impregnated fibrous material may be used to form molded articles, such as rocket engine nozzles and reentry materials, such as rocket nose cones. The presence of the metal atoms in the resin renders the material capable of absorbing large quantities of energy and also results in a higher density material which generally produces improved ablative properties.

The metal containing polymers of this invention may also be used to form films or coatings or may be cast. They may be used in combination with conventional adjuvants such as film forming prepolymers, fillers, etc. with which they are compatible. The metal containing polymers may also be cured and then carbonized and/or treated at graphitizing temperatures and the resultant material ground to provide particles which may be used as a filler in resins, elastomers, etc. to impart energy absorbing characteristics of the metal containing copolymers.

The following examples illustrate the best modes contemplated for carrying out this invention.

EXAMPLE 1

To 10.0 parts by weight of a 72.5% solution of niobium penta(n)butoxide in n-butanol were added 7.50 parts by weight of furfuryl alcohol and 4.66 parts by weight of a hydroquinone/maleic acid prepolymer. This repolymer was prepared by reacting with thorough mixing 5.0 moles of hydroquinone with 4.0 moles of maleic anhydride at 180° C. until a viscous polymer was obtained. The niobium pentabutoxide, the furfuryl alcohol, and the prepolymer were then heated with constant stirring to 126° C. until a clear, dark amber, viscous resin was obtained. This resin can then be solvated with dimethylformamide and thermoset within 2.0 hours at 200° C. Elemental analysis of this resin showed it to contain 14.5% niobium in the thermoset product.

EXAMPLE 2

To 13.6 parts by weight of a 67.2% solution of tantalum penta(n)butoxide in n-butanol were added 7.80 parts by weight of furfuryl alcohol and 4.80 parts by weight of the hydroquinone/maleic acid prepolymer described in Example 1. The tantalum pentabutoxide, the furfuryl alcohol, and the prepolymer were then heated with constant stirring to 128° C. until a clear, dark amber, viscous resin was obtained. This resin can then be solvated with dimethylformamide and thermoset within 2.0 hours at 200° C. Elemental analysis of this resin showed it to contain 24.3% tantalum in the thermoset product.

EXAMPLE 3

(Copolymerizatin of Niobium and Tantalum Resins)

The two solvated resins described in the previous examples were combined as follows. To 10.25 parts of the niobium resin described in Example 1 at 52.0% solids were added 3.00 parts of the tantalum resin described in Example 2 at 48.4% solids. This mixture was then stirred for a 10 minute period as the temperature rose from 23 to 30° C. The resulting homogeneous, clear, dark amber, semi-viscous resin thermoset within 2.0 hours at 200° C.

What is claimed is:

1. A thermosetting furan based resin containing niobium, tantalum, or a mixture of niobium and tantalum chemically bonded in the backbone of the polymer.

2. A thermosetting resin as defined in claim 1 obtained by the reaction of niobium or tantalum penta(n)butoxide with furfuryl alcohol and a hydroxy terminated dienophile prepolymer.

3. A thermosetting furan based resin containing niobium chemically bonded in the backbone of the polymer.

4. A thermosetting furan based resin containing tantalum chemically bonded in the backbone of the polymer.

5. A thermosetting furan based resin containing niobium and tantalum chemically bonded in the backbone of the polymer.

6. A process for the preparation of a thermosetting resin as defined in claim 2 which comprises reacting niobium or tantalum penta(n)butoxide with furfuryl alcohol and a hydroxy terminated dienophile prepolymer.

7. A process for the preparation of a thermosetting resin as defined in claim 3 which comprises reacting niobium penta(n)butoxide with furfuryl alcohol and a hydroxy terminated dienophile prepolymer.

8. A process for the preparation of a thermosetting resin as defined in claim 4 which comprises reacting tantalum penta(n)butoxide with furfuryl alcohol and a hydroxy terminated dienophile prepolymer.

9. A process for the preparation of a thermosetting resin as defined in claim 5 which comprises reacting a thermosetting furan based resin containing niobium atoms with a thermosetting furan based resin cntaining tantalum atoms.

* * * * *